United States Patent
Suhara et al.

(10) Patent No.: US 6,352,565 B2
(45) Date of Patent: Mar. 5, 2002

(54) ELECTRIC DOUBLE LAYER CAPACITOR

(75) Inventors: Manabu Suhara; Kazuya Hiratsuka; Takeshi Kawasato; Katsuji Ikeda, all of Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/947,517

(22) Filed: Sep. 7, 2001

Related U.S. Application Data

(62) Division of application No. 09/460,437, filed on Dec. 14, 1999, now Pat. No. 6,310,763.

(51) Int. Cl.$^7$ .............................. D21F 11/00; H01G 9/02
(52) U.S. Cl. ..................... 29/25.03; 361/502; 162/91
(58) Field of Search ................. 29/25.03; 438/238–241, 438/381; 162/91; 361/502–504

(56) References Cited

U.S. PATENT DOCUMENTS

| | | | |
|---|---|---|---|
| 4,327,400 A | * | 4/1982 | Muranaka et al. .......... 361/433 |
| 4,709,303 A | | 11/1987 | Fujiwara et al. |
| 6,074,523 A | | 6/2000 | Mizobuchi et al. |

FOREIGN PATENT DOCUMENTS

| JP | 9-045586 | 2/1997 |
|---|---|---|

* cited by examiner

*Primary Examiner*—Jey Tsai
(74) *Attorney, Agent, or Firm*—Oblon, Spivak, McClelland, Maier & Neustadt, P.C.

(57) ABSTRACT

An electric double layer capacitor having an element impregnated with a non-aqueous electrolyte, said element comprising positive and negative electrodes made of carbonaceous electrodes, and a separator interposed between the electrodes, wherein said separator is made of paper prepared to contain at least 50 wt % of fibers obtained by beating regenerated cellulose fibers.

6 Claims, No Drawings

ELECTRIC DOUBLE LAYER CAPACITOR

This application is a Division of application Ser. No. 09/460,437 filed Dec. 14, 1999 now U.S. Pat. No. 6,310,763.

BACKGROUND OF THE INVENTION

1. Field of the Invention

The present invention relates to a non-aqueous type electric double layer capacitor which has a high power output and a high energy density.

2. Discussion of Background

Heretofore, as a separator to be disposed between positive and negative electrodes of an electric double layer capacitor, a polyethylene non-woven fabric, a polypropylene non-woven fabric, a polyester non-woven fabric, kraft paper, a rayon/sisal mixed sheet, a manila hemp sheet or a glass fiber sheet is, for example, known (e.g. JP-A-9-45586, JP-A-1-304719). The role of a separator is to electrically insulate the positive electrode from the negative electrode on one hand and to facilitate transfer of ions in the electrolyte, which takes place accompanying charge and discharge, on the other hand.

In recent years, an attention has been drawn to an electric double layer capacitor for high power applications. However, with a separator made of organic fibers e.g. a polyethylene, the ion conductivity is low, and the internal resistance of the electric double layer capacitor is high, since the liquid absorbing property and the liquid-holding property for the electrolyte are low. Accordingly, if instantaneous large current discharge was carried out as one of main characteristics of an electric double layer capacitor, the voltage drop was substantial, such being not practical.

Further, a conventional separator made of paper is excellent in heat resistance and tensile strength and is sometimes effective for an electric double layer capacitor to be used for a power source wherein no large current discharge is carried out, like a hybrid power source used with a solar cell. However, when a conventional separator made of paper is used for an electric double layer capacitor for high power applications, wherein the electrolyte is non-aqueous, the ion permeability tends to be inadequate.

With an electric double layer capacitor, it is desired to lower the resistance and to increase the capacitance per unit volume, and it is accordingly required to make the separator as thin as possible. However, if a separator made of paper is made thin, the insulating property between the positive and negative electrodes tends to be inadequate, thus leading to micro-short circuiting, serious self-discharge.

SUMMARY OF THE INVENTION

Under these circumstances, it is an object of the present invention to realize reduction of the resistance and increase of the capacitance for an electric double layer capacitor by employing a separator which is excellent in heat-resistance and ion permeability, even if it is thin, and has high strength and excellent electronic insulating properties.

The present invention provides an electric double layer capacitor having an element impregnated with a non-aqueous electrolyte, said element comprising positive and negative electrodes made of carbonaceous electrodes, and a separator interposed between the electrodes, wherein said separator is a paper prepared to contain at least 50 wt % of fibers obtained by beating regenerated cellulose fibers.

Now, the present invention will be described in further detail with reference to the preferred embodiments.

In the present invention, the starting material of the separator for the electric double layer capacitor using a non-aqueous electrolyte, is regenerated cellulose fibers which can be beaten with a beating machine installed in a usual paper-making process, such as regenerated cellulose fibers having a high polymerization degree, or solvent-spun rayon fibers. They are used after beaten for the material of the separator.

If the paper constituting the separator is made of less than 50 wt % of fibers obtained by beating regenerated cellulose fibers, the separator obtained therefrom tend to have high electric resistance and poor strength. In order to maintain the strength of the separator, it is conceivable to increase its thickness. However, it is no good since such method increases high electric resistance of the separator. In the present invention, the paper constituting the separator is made of preferably at least 65 wt %, particularly preferably at least 80 wt %, of fibers obtained by beating regenerated cellulose fibers.

Regenerated cellulose fibers will be uniformly fibrillated and will have increased flexibility with the beating treatment. Accordingly, the separator made of paper prepared to contain at least 50 wt % of such fibers, is excellent in tensile strength. Further, the fibers fibrillated by beating, are extremely dense, and the cross sections of fibrils are substantially circular. Accordingly, the separator made of paper prepared to contain at least 50 wt % of such fibers, has a low resistance.

The regenerated cellulose fibers of the present invention are preferably beaten until from 0 to 600 ml of Canadian Standard Freeness (hereafter referred as CSF value) stipulated in JIS P8121. The regenerated cellulose fibers from solvent-spun rayon etc. have a CSF value of about 800 ml in the unbeaten state. Unless such fibers are adequately beaten, they will not be sufficiently fibrillated and will have low strength due to inadequate bonding site obtained by fibrils. Accordingly, such fibers are preferably beaten until the CSF value become 600 ml or less. The regenerated cellulose fibers may be beaten until the CSF value become 0 ml because they are expected to have a high strength as their density increases in proportion to the degree of the beating.

Other material to be incorporated to the beaten regenerated cellulose fibers, is not particularly limited, and any fibers such as Manila hemp, sisal or kraft pulp, may be used. Such a material is preferably beaten depending upon the degree of beating of the regenerated cellulose fibers.

The separator in the present invention can be prepared, for example, as follows. Firstly, regenerated cellulose fibers cut into a few mm are beaten to have proper CSU value by a beating machine. On the other hand, fibers to be used as a blend material are likewise beaten to a proper degree, followed by mixing so that the regenerated cellulose fibers are contained in an amount of at least 50 wt %, whereupon a paper having predetermined thickness is prepared. The paper thus obtained is used as the separator which is interposed between positive and negative electrodes.

In the present invention, the separator has preferably a thickness of from 20 to 60 $\mu$m and a density of from 0.30 to 0.60 g/cm$^3$. If the thickness is less than 20 $\mu$m, inadequate insulation between the positive and negative electrodes is likely to occur. If the thickness is more than 60 $\mu$m, the energy density tends to be low. Further, if the density is less than 0.3 g/cm$^3$, the strength of the separator becomes inadequate. If the density is more than 0.60 g/cm$^3$, the ion permeability become insufficient. It is particularly preferred that the thickness is from 30 to 50 µm and the density is from 0.35 g/cm³ to 0.50 g/cm³.

In the present invention, the separator may be made by overlaying sheets of the paper prepared to contain at least 50 wt % of fibers obtained by beating regenerated cellulose fibers. Further, the separator may also be composed by overlaying said paper and paper made of different material from said paper or non-woven fabric. When the separator is composed of sheets of the paper overlaid, a multilayered paper prepared at a procedure of paper making can be used. The separator prepared by overlaying a plurality of said paper or by overlaying the other paper and said paper is preferred in order to avoid short-circuit between the positive and negative electrodes. However, its power output per unit volume tends to be low because the thickness of the separator become large.

The separator composed of the paper prepared to contain at least 50 wt % of fibers obtained by beating regenerated cellulose fibers usually contains from 3 to 10 wt % of moisture. It is preferred to remove such a moisture in order to reduce the leakage of current and to secure a high withstand voltage in the non-aqueous type electric double layer capacitor. The moisture contained in said paper for the separator in use is preferably not higher than 1 wt %.

In order to efficiently remove the moisture, it is preferred to heat the separator at a temperature of from 90 to 250° C. before disposing it between a positive electrode and a negative electrode. In order to obtain an electric double layer capacitor having a particularly large capacitance, it is preferred to have a structure such as a cylindrical type prepared in such a manner that a pair of electrodes are wound with an separator interposed therebetween, to form an element, and the element is impregnated with a non-aqueous electrolyte and accommodated in a bottomed cylindrical casing, or an angular type prepared in such a manner that a plurality of rectangular electrodes as positive and negative electrodes are alternately laminated with a separator interposed therebetween, to form an element and the element is impregnated with a non-aqueous electrolyte and accommodated in a bottomed angular casing. But, it is difficult to remove the moisture efficiently after an element is formed by the electrode and the separator.

If the temperature of heat treatment is lower than 90° C., inadequate reduction in the leakage of current etc. can be obtained because the removal of the moisture in the separator is not sufficient. On the contrary, if the temperature of heat treatment exceeds 250° C., the separator itself is likely to undergo thermal decomposition, whereby the strength tends to be low and water may be generated. The temperature for heat treatment is, more preferably, from 120 to 230° C. The time for heat treatment is usually at least 3 seconds, while it is suitably selected from the relation with the temperature for heat treatment.

The method for the heat treatment may suitably be selected from methods such as contacting with a hot heater, irradiation with ultraviolet rays or leaving in an atmosphere of heated air. The separator is usually available in a rolled state, but in such a rolled state, it is difficult to effectively remove the moisture by heating in a short period of time. It is preferred to heat it in a state not laminated, so that removal of the moisture can effectively be carried out. Specifically, a rolled paper for the separator may be rewound under heating in a dry atmosphere to obtain a dehydrated paper roll, or a plurality of paper sheets are preliminary cut out from the rolled paper for the separator, and heated to remove moisture in such a state that the paper sheets are not intimately put together, e.g. by having a heat-resistant porous spacer interposed therebetween.

In the electric double layer capacitor of the present invention, the electrodes for both positive and negative electrodes, are carbonaceous electrodes comprising a carbon material as the main component, and the capacitor is based on a principle that electric charge is stored in an electric double layer formed at the interface between the electrodes and the electrolyte. To increase the capacitance of an electric double layer capacitor, the specific surface area of the carbon material is preferably large, and the carbonaceous electrodes are preferably made of a carbon material having a specific surface area of from 700 to 2,500 m²/g and an organic binder.

As the carbon material, activated carbon, carbon black or polyacene may, for example, be used. To the carbonaceous electrodes, an electrically conductive material may be incorporated to increase the electrical conductivity, as the case requires. An organic binder is added to the carbon material, and the carbonaceous electrode is formed into a sheet shape on a metal current collector so that it is integrated with the current collector to form an electrode assembly. The organic binder to be used here, may preferably be, for example, a polyvinylidene fluoride, a polytetrafluoroethylene, a polyimide resin or a polyamideimide resin. The metal current collector may, for example, be a foil, a net or the like of e.g. aluminum or stainless steel. Particularly preferred is aluminum, since it is light in weight and has a low resistance.

The electrolyte to be used for an electric double layer capacitor includes an aqueous electrolyte and a non-aqueous electrolyte. However, the nominal voltage is about 0.8 V with the aqueous electrolyte, while it is about 2.5 V with the non-aqueous electrolyte. The stored energy of an electric double layer capacitor is proportional to the square of the cell voltage. Accordingly, from the viewpoint of the energy density, it is preferred to use the non-aqueous electrolyte, as the energy density can be made larger by about 9 times.

The solute for the non-aqueous electrolyte for the electric double layer capacitor of the present invention is preferably at least one salt comprising a quaternary onium cation represented by $R^1R^2R^3R^4N^+$ or $R1R^2R^3R^4P^+$, wherein each of $R^1$, $R^2$, $R^3$ and $R^4$ which are independent of one another, is a $C_{1-6}$ alkyl group, and an anion such as $BF_4^-$, $PF_6^-$, $SO_3CF_3^-$, $A_sF_6^-$, $N(SO_2CF_3)_2^-$ or $ClO_4^-$.

Further, the organic solvent to be used for the non-aqueous electrolyte is preferably a cyclic carbonate such as ethylene carbonate, propylene carbonate or butylene carbonate, a linear carbonate such as dimethyl carbonate, ethyl methyl carbonate or diethyl carbonate, acetonitrile, sulfolane or a sulfolane derivative. It is particularly preferably at least one member selected from the group consisting of propylene carbonate, ethylene carbonate, dimethyl carbonate, diethyl carbonate, methyl ethyl carbonate, acetonitrile, sulfolane and methylsulfolane.

As the shape of the electric double layer capacitor of the present invention, preferred is a cylindrical type prepared in such a manner that a pair of elongated electrodes are wound with an elongated separator interposed therebetween, to form an element, and the element is impregnated with a non-aqueous electrolyte and accommodated in a bottomed cylindrical casing, or an angular type prepared in such a manner that a plurality of rectangular electrodes as positive and negative electrodes are alternately stacked with a separator interposed therebetween, to form an element, and the element is impregnated with a non-aqueous electrolyte and accommodated in a bottomed angular casing, since it is thereby possible to obtain a large capacitance. In particular, the separator having a high strength even a small thickness in the present invention is suitable for the cylindrical type, wherein the separator as well as the electrodes is needed to have an adequate tensile strength when it is wound.

Now, the present invention will be described in further detail with reference to Examples. However, it should be understood that the present invention is by no means restricted to such specific Examples.

EXAMPLE 1

Solvent-spun rayon was beaten until the CSF value became 20 ml, and this rayon was used to sheet a paper having a thickness of 40 μm and a density of 0.40 g/cm$^3$.

The paper was used as a separator. Its tensile strength was 0.70 kg/cm-width. This separator contained 7 wt % of moisture. This separator was cut into a sheet of 5 cm×7 cm and was preliminarily dried in air at 150° C. for 1 hour to remove water to bring the moisture content to not higher than 1 wt %.

An electrode (electrode area: 24 cm$^2$, electrode thickness: 0.15 mm) obtained by forming into a sheet shape a composition comprising 80 wt % of activated carbon having a specific surface area of 1,500 m$^2$/g, 10 wt % of carbon black and 10 wt % of polytetrafluoroethylene as a binder, was bonded via a conductive adhesive to one side of a rectangular aluminum foil having a width of 4 cm, a height of 6 cm and a thickness of 50 μm and having a lead terminal, followed by heating to thermally cure the adhesive and further by drying at 200° C. to obtain an electrode assembly.

In a glove compartment with a dew point of 50° C., two such electrode assemblies were overlaid to one another with the above-mentioned dehydrated separator interposed, so that the electrode sides faced each other.

This laminate was sandwiched between a pair of glass plates having a thickness of 2 mm, a width of 5 cm and a height of 7 cm, to form a capacitor element. The total thickness of the electrode assemblies and the separator was 0.44 mm. Then, this element was heated in vacuum at 200° C. for 3 hours to further remove impurities and moisture in electrodes.

As an electrolyte, a solution containing 1.5 mol/l of triethylmonomethylammonium tetrafluoroborate dissolved in propylene carbonate, was employed. This electrolyte was vacuum-impregnated to the above element, and the element was used to obtain an electric double layer capacitor. The internal resistance and the capacitance were obtained at current density of 20 mA/cm$^2$. The internal resistance was 0.2 Ω and the capacitance was 13.2 F. The leakage current at a voltage of 2.5 V was 8 μA. The capacitance per 1 cm$^3$ of the element was 12.5 F and the internal resistance per 1 cm$^3$ of the element was 0.21 Ω.

EXAMPLE 2

70 wt % of fibers obtained by beating Solvent-spun rayon until the CSF value became 100 ml and 30 wt % of fibers obtained by beating Manila hemp until the CSF value became 400 ml were mixed and sheeted to obtain a paper having a thickness of 50 μm and a density of 0.35 g/cm$^3$. A capacitor element was assembled in the same manner as in Example 1 except that the sheeted paper was used as a separator, which was preliminarily dried at 200° C. for 1 hour. The tensile strength of the separator was 0.96 kg/cm width.

An electric double layer capacitor cell was prepared in the same manner as in Example 1 except that the above element was used, and the performance was evaluated. The total thickness of the electrodes and the separator was 0.45 mm. The internal resistance was 0.24 Ω and the capacitance was 12.1 F. The leakage current at a voltage of 2.5 V was 6 μA. The capacitance per 1 cm$^3$ of the element was 11.2 F and the internal resistance per 1 cm$^3$ of the element was 0.26 Ω.

EXAMPLE 3

An electric double layer capacitor cell was prepared in the same manner as in example 1 except that no preliminary drying of the separator was carried out, and the performance was evaluated. The total thickness of the electrodes and the separator was 0.45 mm. The internal resistance was 0.24 Ω and the capacitance was 12.1 F. The leakage current at the voltage of 2.5 V was 13 μA. The capacitance per 1 cm$^3$ of the element was 11.2 F and the internal resistance per 1 cm$^3$ of the element was 0.26 Ω.

EXAMPLE 4 (Comparative Example)

70 wt % of fibers unbeaten Solvent-spun rayon (the CSF value 800 ml) and 30 wt % of fibers obtained by beating Manila hemp until the CSF value became 200 ml were mixed and sheeted to obtain a paper having a thickness of 60 μm and a density of 0.35 g/cm$^3$. The paper was used as a separator, which had a tensile strength of 0.83 kg/cm.

An electric double layer capacitor cell was prepared in the same manner as in Example 1 except that the above element was used, and the performance was evaluated. The total thickness of the electrodes and the separator was 0.46 mm. The internal resistance was 1.30 Ω and the capacitance was 8.2 F. The leakage current at a voltage of 2.5 V was 5 μA. The capacitance per 1 cm$^3$ of the element was 7.4 F and the internal resistance per 1 cm$^3$ of the element was 1.44 Ω.

EXAMPLE 5 (Comparative Example)

As a separator was used a sheet of non woven fabric made of polypropylene (thickness: 160 μm, weight: 52 g/m$^2$). The separator had a tensile strength of 1.53 kg/cm width. An electric double layer capacitor cell was prepared in the same manner as in Example 1 except that the capacitor element was heated in vacuum at 120° C., and the characteristics was evaluated. The internal resistance was 2.0 Ω and the capacitance was 6.5 F. The leakage current at a voltage of 2.5 V was 14 μA. The capacitance per 1 cm$^3$ of the element was 4.85 F and the internal resistance per 1 cm$^3$ of the element was 2.68 Ω.

EXAMPLE 6 (comparative example)

Solvent-spun rayon beaten until the CSF value of 500 ml and with sisal hemp were mixed and sheeted to a paper having a thickness of 70 μm and a density of 0.48 g/cm$^3$ (a weight ratio of Solvent-spun rayon/sisal hemp was 40/60). A capacitor element was assembled in the same manner as in Example 1 except that the above paper was used as a separator. The tensile strength of the separator was 1.56 kg/cm width.

An electric double layer capacitor cell was prepared in the same manner as in Example 1 except that the above element was used, and the performance was evaluated. The total thickness of the electrodes and the separator was 0.47 mm. The internal resistance was 1.10 Ω and the capacitance was 9.3 F. The leakage current at a voltage of 2.5 V was 8 μA. The capacitance per 1 cm$^3$ of the element was 8.2 F and the internal resistance per 1 cm$^3$ of the element was 1.24 Ω.

According to the present invention, it is possible to obtain an electric double layer capacitor which has a low internal resistance, a low leakage current and a high capacitance density. Further, the separator of the present invention has adequate strength for winding, and jelly-rolled type electric double layer capacitor can easily be prepared.

The electric double layer capacitor by the present invention is particularly suitable for a jelly-rolled type or a stacked type electric double layer capacitor for a large capacitance or a large current, whereby the discharge capacitance from 50 to 20,000 F or the discharge current from 1 to 1,000 A is attained.

What is claimed is:

1. A method for producing an electric double layer capacitor, which comprises forming an element by interposing a separator between positive and negative electrodes made of carbonaceous electrodes, and impregnating said element with a non-aqueous electrolyte, said separator being made of paper prepared to contain at least 50 wt % of fibers obtained by beating regenerated cellulose fibers, and said separator being preliminarily heat-treated at from 90 to 250° C.

2. The method of producing an electric double layer capacitor according to claim 1, wherein the water content in said separator is not higher than 1 wt % after heat-treated.

3. The method of producing an electric double layer capacitor according to claim 1, wherein the fibers obtained by beating regenerated cellulose fibers have from 0 to 600 ml of Canadian Standard Freeness.

4. The method of producing an electric double layer capacitor according to claim 1, wherein the separator has a thickness of from 20 to 60 μm and a density of from 0.30 to 0.60 g/cm$^3$.

5. The method of producing an electric double layer capacitor according to claim 1, wherein the carbonaceous electrodes are made of a carbon material having a specific surface area of from 700 to 2,500 m$^2$/g and an organic binder.

6. The method of producing an electric double layer capacitor according to claim 1, wherein the solute of the non-aqueous electrolyte is a salt comprising a quaternary onium cation represented by $R^1R^2R^3R^4N^+$ or $R^1R^2R^3R^4P^+$, wherein each of $R^1$, $R^2$, $R^3$ and $R^4$ which are independent of each other, is a $C_{1-6}$ alkyl group, and an anion of $BF_4^-$, $PF_6^-$, $SO_3CF_3^-$, $AsF_6^-$, $N(SO_2CF_3)_2^-$ or $ClO_4^-$, and the solvent of the non-aqueous electrolyte is at least one member selected from the group consisting of propylene carbonate, ethylene carbonate, dimethyl carbonate, diethyl carbonate, methyl ethyl carbonate, acetonitrile, sulfolane and methylsulfolane.

* * * * *